(12) United States Patent
Joulia et al.

(10) Patent No.: US 12,441,659 B2
(45) Date of Patent: Oct. 14, 2025

(54) FUSED SAND-RESISTANT TURBINE PART

(71) Applicant: SAFRAN, Paris (FR)

(72) Inventors: Aurélien Joulia, Moissy-Cramayel (FR); Luc Patrice Bianchi, Moissy-Cramayel (FR); Benjamin Dominique Roger Joseph Bernard, Joue-les-Tours (FR)

(73) Assignee: SAFRAN, Paris (FR)

( * ) Notice: Subject to any disclaimer, the term of this patent is extended or adjusted under 35 U.S.C. 154(b) by 857 days.

(21) Appl. No.: 17/416,916

(22) PCT Filed: Dec. 20, 2019

(86) PCT No.: PCT/FR2019/053269
§ 371 (c)(1),
(2) Date: Jun. 21, 2021

(87) PCT Pub. No.: WO2020/128402
PCT Pub. Date: Jun. 25, 2020

(65) Prior Publication Data
US 2022/0064072 A1 Mar. 3, 2022

(30) Foreign Application Priority Data
Dec. 20, 2018 (FR) ...................................... 1873666

(51) Int. Cl.
C04B 35/22 (2006.01)
C04B 35/622 (2006.01)
(Continued)

(52) U.S. Cl.
CPC ........ C04B 35/22 (2013.01); C04B 35/62222 (2013.01); C04B 35/657 (2013.01);
(Continued)

(58) Field of Classification Search
CPC . C04B 35/22; C04B 35/62222; C04B 35/657; C04B 2235/3234;
(Continued)

(56) References Cited

U.S. PATENT DOCUMENTS

2017/0022113 A1 1/2017 Opila
2017/0122116 A1* 5/2017 Lee .................... F01D 5/147

FOREIGN PATENT DOCUMENTS

EP 3 178 799 A1 6/2017

OTHER PUBLICATIONS

Jegadeesan et al. "Characterization of M-O bonds in Y2Ti2O7 and Y2TiO5 with EELS". Phys. Status Solidi B, 252, No. 1 (2015), p. 206-211. (Year: 2015).*

(Continued)

Primary Examiner — Coris Fung
Assistant Examiner — Catriona M Corallo
(74) Attorney, Agent, or Firm — Sughrue Mion, PLLC

(57) ABSTRACT

A turbine part includes a substrate, an environmental barrier and one or more reactive layers. The environmental barrier includes a thermal insulation layer, a sublayer suitable for promoting adhesion between the substrate and the thermal insulation layer, and a protective layer suitable for protecting the substrate from oxidation and/or corrosion and partially covers the substrate. The one or more reactive layers are suitable for reacting with at least one CMAS compound selected from a calcium oxide, a magnesium oxide, an aluminum oxide and a silicon oxide, and cover a portion of the environmental barrier.

14 Claims, 3 Drawing Sheets

(51) Int. Cl.
    *C04B 35/657*    (2006.01)
    *C23C 4/11*      (2016.01)
    *C23C 4/134*     (2016.01)
    *F01D 5/18*      (2006.01)

(52) U.S. Cl.
    CPC ............... *C23C 4/11* (2016.01); *C23C 4/134* (2016.01); *F01D 5/18* (2013.01); *C04B 2235/3234* (2013.01); *C04B 2235/3454* (2013.01); *C04B 2235/767* (2013.01); *C04B 2235/9669* (2013.01)

(58) Field of Classification Search
    CPC ...... C04B 2235/3454; C04B 2235/767; C04B 2235/9669; C23C 4/11; C23C 4/134; F01D 5/18
    USPC ..................................................... 106/287.19
    See application file for complete search history.

(56) References Cited

OTHER PUBLICATIONS

R.I. Webster, et al., "Investigation of Rare Earth (RE) Titanates as Potential Environmental Barrier Coating (EBC) Constituents for Mitigation of CMAS Attack", XXVI International Materials Research Congress, Aug. 25, 2017, 1 page.
International Search Report for PCT/FR2019/053269 dated May 12, 2020 [PCT/ISA/210].
Written Opinion for PCT/FR2019/053269 dated May 12, 2020 [PCT/ISA/237].
French Search Report for 1873666 dated Oct. 30, 2019.

\* cited by examiner

[Fig. 1]
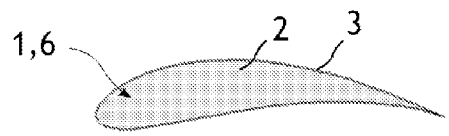
[Fig. 2]
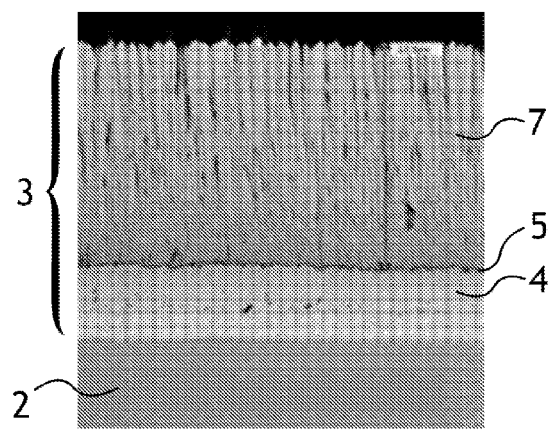
[Fig. 3]
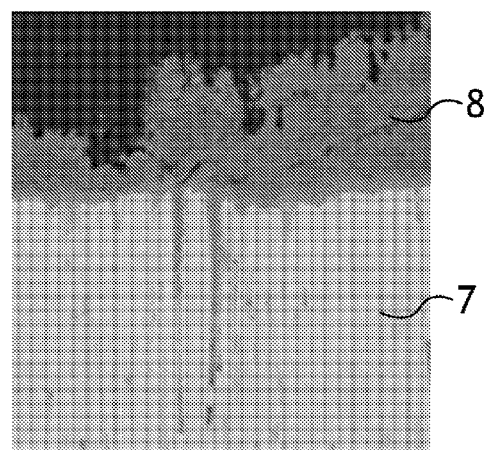

[Fig. 4]
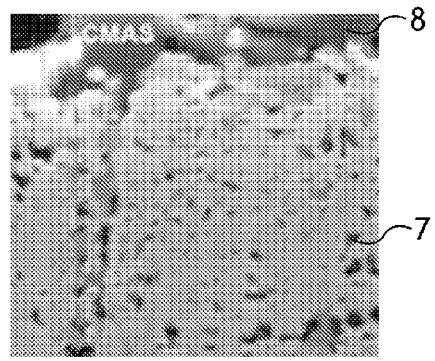
[Fig. 5]
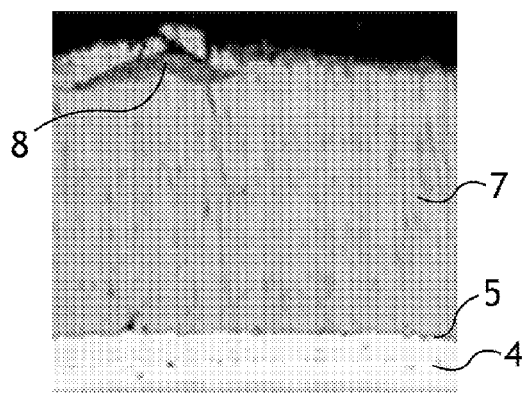
[Fig. 6]
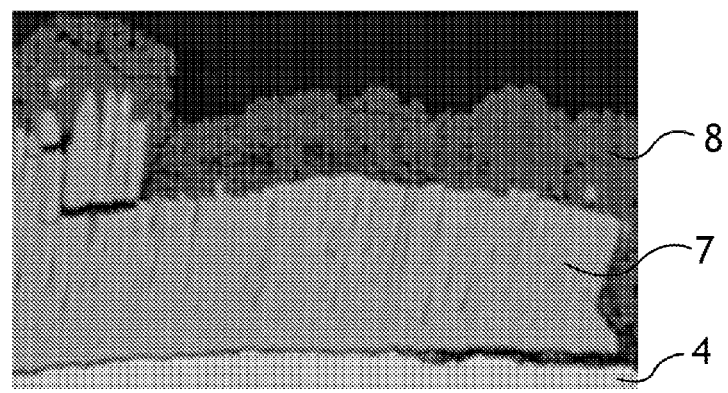

[Fig. 7]
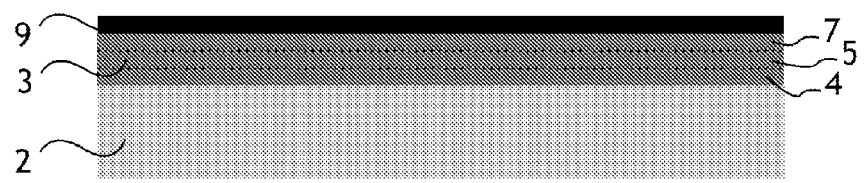
[Fig. 8]
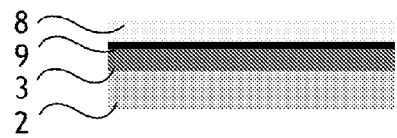
[Fig. 9]
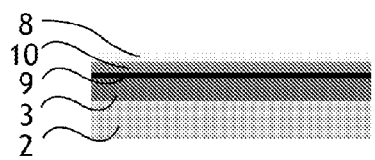

FUSED SAND-RESISTANT TURBINE PART

CROSS REFERENCE TO RELATED APPLICATIONS

This application is a National Stage of International Application No. PCT/FR2019/053269 filed Dec. 20, 2018, claiming priority based on French Patent Application No. 1873666 filed Dec. 20, 2018, the entire contents of each of which being herein incorporated by reference in their entireties.

FIELD OF THE INVENTION

The invention relates to a turbine part, such as a turbine blade or a nozzle vane for example, used in aeronautics.

PRIOR ART

In a turbojet engine, the exhaust gases generated by the combustion chamber can reach high temperatures, exceeding 1200° C. or even 1600° C. A turbojet engine part in contact with these exhaust gases, such as a turbine blade for example, must therefore be able to maintain its mechanical properties at such high temperatures. Moreover, corrosion and/or oxidation of the substrate of the part is promoted by such high temperatures.

To this end, it is known to protect the part against excessive temperatures, oxidation and/or corrosion, by covering it with an environmental barrier.

FIG. 1 schematically illustrates a cross-section of a known turbine part 1, for example a turbine blade 6 or a nozzle vane. The part 1 comprises a substrate 2, for example made of a single-crystal metal superalloy. The substrate 2 is covered with a coating, for example an environmental barrier 3.

FIG. 2 schematically illustrates a cross-section of the known turbine part 1. The part 1 comprises the substrate 2 covered with the environmental barrier 3. The environmental barrier 3 typically comprises a sublayer 4, a protective layer 5 and a thermal insulation layer 7. The sublayer 4 covers the substrate 2. The sublayer 4 is covered by the protective layer 5, formed for example by oxidation of the sublayer 4. The protective layer 5 protects the substrate 2 from corrosion and/or oxidation. The thermal insulation layer 7 covers the protective layer 5. The thermal insulation layer 7 may be made of ceramic, for example yttriated zirconia.

The environmental barrier 3 degrades particularly when exposed to sand particles (for example inorganic compounds such as silica) or more generally to calcium, magnesium, aluminum and/or silicon oxides, the acronym for which is CMAS. CMAS have lower melting temperatures than the materials of the environmental barrier 3, and thus can infiltrate in a molten state into the environmental barrier 3 during use of the part 1, particularly into the interstices of the environmental barrier 3. CMAS infiltration into the environmental barrier 3 leads to the stiffening of the environmental barrier 3, which can lead to mechanical failure of the environmental barrier 3 under the operating conditions of the turbine. CMAS infiltration also leads to dissolution of the thermal insulation layer 7 by chemical reaction between the CMAS and the thermal insulation layer 7.

With reference to FIG. 3 and FIG. 4, one or more CMAS compounds 8 may infiltrate into the interstices of the thermal insulation layer 7, causing the thermal insulation layer 7 to stiffen.

With reference to FIG. 5 and FIG. 6, the thermal insulation layer 7 can be rumpled and ruptured by insertion of CMAS compounds 8 during use of the part 1, and for example be detached from the sublayer 4.

Levi et al. (Levi, C. G., Hutchinson, J. W., Vidal-Sétif, M. H., & Johnson, C. A. (2012). Environmental degradation of thermal-barrier coatings by molten deposits. MRS bulletin, 37 (10), 932-941) describes the use of a part 1 coated with rare-earth zirconate, such as $Gd_2Zr_2O_7$ (GZO). On contact with CMAS, the rare-earth zirconate is dissolved and precipitates, on the one hand, into a fluorite phase Zr(Gd, Ca)Ox and, on the other, into a very stable apatite phase $Ca_2Gd_8(SiO_4)_6O_2$. These precipitations lead to the filling of the interstices present between the different GZO columns and/or the thermal insulation layer 7 and to the formation of a diffusion barrier, thus slowing the dissolution rate of the GZO columns and/or the thermal insulation layer 7.

On the other hand, precipitation of molten CMAS, described by Levi et al., fills the interstices when the CMAS has entered the interstices of the GZO and/or the thermal insulation 7, layer leading to deterioration of the mechanical properties of the environmental layer 3.

For example, a reactive layer of lanthanum zirconate ($La_2Zr_2O_7$) can also be deposited on a turbine part. Upon contact of the reactive layer with molten CMAS, a portion of the reactive layer is dissolved, and the reaction between the reactive layer and the CMAS produces an apatite phase of $Ca_2La_8(SiO_4)_6O_2$. Cracks appear in the reactive layer, resulting in areas of the part that are not protected from CMAS.

US 2016/011589 describes a reactive layer comprising an anti-CMAS coating comprising an oxide having a weberite structure, to prevent infiltration of molten CMAS into the environmental barrier.

DISCLOSURE OF THE INVENTION

One aim of the invention is to increase the resistance of a turbine part to CMAS compounds.

Another aim of the invention is to propose a coating enabling a turbine part to resist CMAS compounds different from a known coating of the prior art.

Another aim of the invention is to propose a coating enabling a turbine part to resist CMAS adjustable mechanical and/or compounds and having chemical properties.

These aims are achieved in the context of the present invention by virtue of a turbine part, comprising:
 a substrate,
 an environmental barrier comprising at least one layer selected from a thermal insulation layer, a sublayer suitable for promoting adhesion between the substrate and a thermal insulation layer, and a protective layer suitable for protecting the substrate from oxidation and/or corrosion, the environmental barrier at least partially covering the substrate
 at least one reactive layer suitable for reacting with at least one CMAS compound selected from a calcium oxide, a magnesium oxide, an aluminum oxide and a silicon oxide, the reactive layer covering at least a portion of the environmental barrier,
 characterized in that the material of the reactive layer comprises an oxide of formula $A'A''BO_{5+\delta}$, A' being selected from a rare-earth element and yttrium, A'' being selected from a rare-earth element, yttrium and aluminum, B being selected from titanium, zirconium, hafnium, tantalum and niobium, δ being a real number comprised between 0 and 0.5.

The invention is advantageously supplemented by the following features, taken individually or in any technically possible combination thereof:
- the oxide has a lattice selected from a cubic lattice, an orthorhombic lattice and a hexagonal lattice,
- the oxide has a rare-earth element atomic fraction comprised between 16% and 25%, in particular between 18% and 25%, and more preferentially between 20% and 25%,
- A' and A" are the same element, A' and A" being selected from a rare-earth element, aluminum, scandium and yttrium,
- the part comprises at least two reactive layers, the two reactive layers having at least one different element selected from A', A" and B,
- the oxide is suitable for forming a precipitate comprising apatite upon contact with a CMAS compound selected from a calcium oxide, a magnesium oxide, an aluminum oxide and a silicon oxide,
- the oxide has a crystal lattice having at least one space group of the type selected from

[Math. 1]

$Fm\overline{3}m$,

[Math. 2]

$Pnma$ and

[Math. 3]

$P6_3/mmc$,

- the reactive layer directly covers a layer selected from the thermal insulation layer and the protective layer,
- the reactive layer has a thickness comprised between 5 μm and 500 μm, the reactive layer comprises between 5% and 80% by volume of said oxide and further comprises at least 10% by volume of an element selected from YSZ, $Al_2O_3$, $Y_2O_3$—$ZrO_2$—$Ta_2O_5$, $RE_2Zr_2O_7$, and $RE_2Si_2O_7$ and combinations thereof, wherein RE denotes an element selected from yttrium and a lanthanide,
- the oxide is suitable for forming a product upon a first reaction with the CMAS compound, said product being suitable for forming an apatite phase upon a second reaction with the CMAS compound and/or with another product of the first reaction.

The invention also relates to a process for protecting a turbine part comprising a step of depositing on the part a reactive layer suitable for reacting with at least one CMAS compound selected from a calcium oxide, a magnesium oxide, an aluminum oxide and a silicon oxide, characterized in that the material of the reactive layer comprises an oxide of formula $A'A''BO_{5+\delta}$, A' being selected from a rare-earth element and yttrium, A" being selected from a rare-earth element, yttrium, and aluminum, scandium B being selected from titanium, zirconium, hafnium, tantalum and niobium, δ being a real number comprised between 0 and 0.5.

Advantageously, the process is supplemented by the following features, taken individually or in any technically possible combination thereof:
- the part comprises a substrate and an environmental barrier comprising at least one layer selected from a thermal insulation layer, a sublayer suitable for promoting adhesion between the substrate and a thermal insulation layer, and a protective layer suitable for protecting the substrate from oxidation and/or corrosion, the environmental barrier at least partially covering the substrate, the reactive layer being deposited on the environmental barrier,
- the reactive layer is deposited by a method selected from atmospheric-pressure or low-pressure plasma spraying, suspension plasma spraying, solution plasma spraying, high-velocity powder or suspension flame spraying, electron-beam evaporation, vapor deposition, sol-gel and electrophoresis.

DESCRIPTION OF THE FIGURES

Other features, aims and advantages of the invention will emerge from the following description, which is purely illustrative and non-limiting, and which should be read in conjunction with the appended drawings in which:

FIG. 1 schematically illustrates a cross-section of a turbine part, for example a turbine blade or a nozzle vane, FIG. 2 is a microphotograph illustrating a cross-section of substrate covered with an environmental barrier, FIG. 3 is a microphotograph illustrating the insertion of molten CMAS compounds into the environmental barrier, FIG. 4 is a microphotograph illustrating the insertion of molten CMAS compounds into the environmental barrier, FIG. 5 is a microphotograph illustrating the rupture of an environmental barrier, FIG. 6 is a microphotograph illustrating the rupture of an environmental barrier, FIG. 7 is a schematic illustration of a turbine part comprising a coating in accordance with the invention, FIG. 8 schematically illustrates a turbine part comprising a coating in accordance with the invention, in contact with CMAS compounds, FIG. 9 schematically illustrates a turbine part comprising a coating in accordance with the invention.

Throughout the figures, similar elements bear identical reference marks.

DEFINITIONS

The term "superalloy" refers to an alloy which, at high temperature and high pressure, has very good resistance to oxidation, corrosion, creep and cyclic stresses (particularly mechanical or thermal stresses). Superalloys have a particular application in the manufacture of parts used in aeronautics, for example turbine blades, because they constitute a family of high-strength alloys that can work at temperatures relatively close to their melting points (typically 0.7 to 0.8 times their melting temperatures).

A superalloy can have a two-phase microstructure comprising a first phase (called "γ phase") forming a matrix, and a second phase (called "γ' phase") forming precipitates hardening in the matrix. The coexistence of these two phases is referred to as the γ-γ' phase.

The "base" of the superalloy refers to the main metal component of the of matrix. In most cases, superalloys comprise an iron, cobalt, or nickel base, but sometimes also a titanium or aluminum base. The base of the superalloy is preferentially a nickel base.

"Nickel-base superalloys" have the advantage of providing a good compromise between oxidation resistance, high-temperature fracture resistance and weight, which justifies their use in the hottest parts of turbojet engines.

Nickel-base superalloys are made up of a γ phase (or matrix) of the γ-Ni face-centered cubic austenitic type, possibly containing additives in α (Co, Cr, W, Mo)-substituted solid solution, and a γ' phase (or precipitates) of the γ'-Ni$_3$X type, with X=Al, Ti or Ta. The γ' phase has an ordered L12 structure, derived from the face-centered cubic structure, coherent with the matrix, i.e., having an atomic lattice very close thereto.

The term "volume fraction" refers to the ratio of the volume of an element or a group of elements to the total volume.

A "space group" of a crystal refers to the set of symmetries of a crystal structure, that is to say the set of isometries affine leaving the structure invariant. It is a group in the mathematical sense of the term. Preferentially, a crystal is organized, in the invention, according to a space group of the type

[Math. 4]

$Fm\overline{3}m$, a space group of the type

[Math. 5]

$Pnma$ and/or a space group of the type

[Math. 6]

$P6_3/mmc$.

DETAILED DESCRIPTION OF THE INVENTION

With reference to FIG. 7, a part 1 comprises a substrate 2. The substrate 2 may preferentially be a superalloy substrate 2, and preferably a nickel-base superalloy substrate as described above. The substrate 2 is covered, at least in part, by an environmental barrier 3. The environmental barrier 3 may comprise, in a known manner, and as illustrated in FIG. 1, a sublayer 4 extending between the substrate 2 and the other layers of the environmental barrier 3, directly covering the substrate 2, suitable for promoting adhesion between the substrate 2 and the other layers of the environmental barrier 3. The environmental barrier 3 may also comprise a protective layer 5, suitable for protecting the substrate 2 from oxidation and/or corrosion, and directly covering the sublayer 4. The protective layer 5 is, for example, formed by oxidation of the sublayer 4. The protective layer may, for example, be made of alumina. The environmental barrier 3 may also comprise a thermal insulation layer 7, directly covering the protective layer 5.

The part 1 also comprises a reactive layer 9 suitable for reacting with at least one CMAS compound 8. The CMAS compound 8 may be selected from a calcium oxide, a magnesium oxide, an aluminum oxide and/or a silicon oxide and combinations thereof. The reactive layer 9 at least partially covers the environmental barrier 3. It can directly cover at least one of the layers of the environmental barrier 3, selected from the protective layer 5 and the thermal insulation layer 7. Different reactive layers 9 may also cover different layers of the environmental barrier 3. The embodiment illustrated in FIG. 1 comprises at least one reactive layer 9 covering all of the layers of the environmental barrier 3. The reactive layer 9 can have a thickness comprised between 5 μm and 500 μm, so as to allow the formation of an apatite phase upon contact with a CMAS compound 8.

The material of the reactive layer 9 comprises an oxide of formula A'A"BO$_{5+δ}$, A' being selected from a rare-earth element and yttrium, A" being selected from a rare-earth element, yttrium, scandium and aluminum, B being selected from titanium, zirconium, hafnium, tantalum and niobium, δ being a real number comprised between 0 and 0.5. This formula allows the oxide of the reactive layer 9 (hereinafter "the oxide") to have a volume fraction of rare-earth elements and/or yttrium high enough to allow rapid precipitation of the molten CMAS compound(s), and avoid their introduction into interstices presented in the environmental barrier 3. This formula can also advantageously allow the oxide of the reactive layer 9 to have a cubic lattice. Table 1 comprises the various elements A', A" and B that can be selected for the oxide.

TABLE 1

| A' | A" | B |
|---|---|---|
| Sc, Y, La, | Sc, Y, La, | Ta, Nb, |
| Ce, Pr, | Ce, Pr, | Ti, Zr, Hf |
| Nd, Pm, | Nd, Pm, | |
| Sm, Eu, | Sm, Eu, | |
| Gd, Tb, | Gd, Tb, | |
| Dy, Ho, | Dy, Ho, | |
| Er, Tm, | Er, Tm, | |
| Yb, Lu | Yb, Lu, Al | |

Table 1

Thus, the oxide material can have an atomic fraction of rare-earth elements and/or yttrium, aluminum and scandium comprised between 10% and 25%, and preferentially between 18% and 25% when A' and A" are rare-earth elements and/or yttrium. This range of atomic fractions of rare-earth elements and/or yttrium, comprising higher atomic fractions than those of Gd$_2$Zr$_2$O$_7$ for example, allows the reactive layer 9 material to exhibit faster reaction kinetics with CMAS compound(s) 8 than materials described in the prior art (for example Gd$_2$Zr$_2$O$_7$). Thus, the molten CMAS compound(s) 8 in contact with the reactive layer 9 are immobilized faster or are slowed by a production of an apatite phase, thickening and/or solidifying the reactive CMAS compound 8 at the interface with the environmental barrier 3, and avoiding contact between the CMAS compound(s) 8 and other parts of the environmental barrier 3.

By its composition, the oxide may also have a crystal lattice with a cubic crystal structure, preferentially having a space group of the type

[Math. 7]

$Fm\overline{3}m$, and/or a hexagonal type crystal structure, preferentially with a space group

[Math. 8]

$Pnma$, and/or a hexagonal type structure, preferentially with a space group

[Math. 9]

$P6_3/mmc$.

Advantageously, the elements A' and A" may be different. Thus, the reactivity of the oxide with respect to a/the CMAS(s) 8 can be increased by the formation of different phases, comprising at least one apatite phase, for example of formula $Ca_2RE_8(SiO_4)_6O_2$, RE being a rare-earth element or yttrium. One or more secondary oxides may also be produced by the reaction between the oxide and the CMAS compound(s) 8.

Advantageously, the elements A', A", B are selected so as to allow the formation of a secondary oxide, resulting from the reaction between the oxide and the CMAS compound(s) 8. The secondary oxide formed may be reactive to secondary products of the reaction between the oxide and the CMAS compound(s) 8. The secondary oxide formed may also be directly reactive with the CMAS compound 8. The secondary oxides produced may be, for example:

- zirconias ($ZrO_2$) stabilized by lime (CaO) and/or by magnesia (MgO),
- hafnium oxides ($HfO_2$) stabilized by lime (CaO) and/or by magnesia (MgO),
- perovskites, such calcium as ($CaTiO_3$) or magnesium ($MgTiO_3$) titanates.

These different secondary oxides can be suitable for forming an apatite phase upon reaction with the CMAS compound(s) 8.

The elements A' and A" may be the same element A: the oxide of the reactive layer 9 may be described by the formula $A_2BO_{5+\delta}$, δ being a real number comprised between 0 and 0.5. The elements of the oxide are selected from the elements described in Table 2.

TABLE 2

| A | B |
|---|---|
| Sc, Y, La, Ce, Pr, Nd, Pm, Sm, Eu, Gd, Tb, Dy, Ho, Er, Tm, Yb, Lu | Ta, Nb, Ti, Zr, Hf |

Table 2

Thus, the atomic fraction of rare-earth element or aluminum or scandium or yttrium can be increased compared with the known oxides, due to the oxide structure. The production of the reactive layer 9 can also be simplified in this way.

Advantageously, the reactive layer 9 may comprise other anti-CMAS oxides. The reactive layer 9 may comprise between 5% and 80% by volume of said oxide and further comprises at least 10% by volume of an element selected from YSZ, $Al_2O_3$, $Y_2O_3$—$ZrO_2$—$Ta_2O_5$, $RE_2Zr_2O_7$ and $RE_2Si_2O_7$ and combinations thereof, where RE denotes an element selected from yttrium and a lanthanide.

Another aspect of the invention is a process for protecting a part against molten sand(s). The process comprises a step of depositing the reactive layer 9 as described above, on a part 1, or a portion of the part 1. "Portion of the part 1" means a portion of the surface and/or an inner portion of the part 1 (in which case one or more layers of the part 1 may cover the reactive layer 9 once the part 1 is manufactured). After deposition, the part 1 comprises the reactive layer 9. The reactive layer 9 may be deposited directly on the substrate 2 of the part 1, for example a superalloy substrate 2, or on one or more layers of an environmental barrier 3. The deposition of the reactive layer 9 can be performed on at least one of the layers forming the environmental barrier 3, and preferentially on the thermal insulation layer 7. Thus, and unlike known parts, the part 1 comprising the reactive layer 9 deposited on the thermal insulation layer 7 has sufficient reactivity with CMAS compound(s) 8 to produce at least one apatite phase before the insertion of the molten CMAS compound(s) 8 into the interstices of the thermal insulation layer 7, and thus avoid or limit this insertion. In this way, the CMAS compound(s) 8 can have greater difficultly accessing the surface of the environmental barrier 3, and their effect on the breakdown of the environmental barrier 3 is limited.

Example

Reaction Between a Liquid CMAS 8 and a Reactive Layer of $Gd_2TiO_5$

With reference to FIG. 8, a reactive layer 9 comprising the oxide $Gd_2TiO_5$ is subjected to chemical attack by a molten CMAS 8. The reactive layer 9 is deposited by suspension plasma spraying (SPS) during the manufacture of the part 1.

With reference to FIG. 9, after a reaction time of for example more than 5 min, preferentially more than 1 min, a portion of the reactive layer 9 is dissolved by the CMAS compound 8, and an apatite phase $Ca_2Gd_8(SiO_4)_6O_2$ impervious to the molten CMAS 8 is formed between the reactive layer 9 and the molten CMAS 8. The $Ca_2Gd_8(SiO_4)_6O_2$ layer is also impervious to other reaction products (by-products) between the reactive layer 9 and the CMAS 8 compounds. The $Ca_2Gd_8(SiO_4)_6O_2$ layer also allows for the production of secondary phases, thus protecting the reactive layer 9. The environmental barrier 3 has no cracks. Indeed, the cation reservoir of compound A, i.e., A' and A" when A' and A" are the same element, allows a tight layer to be formed and thus limits the penetration depth, compared with the use of a known reactive layer such as $La_2Zr_2O_7$.

The invention claimed is:

1. A turbine part, comprising a substrate, an environmental barrier and at least one reactive layer,
    the environmental barrier comprising a thermal insulation layer, a sublayer suitable for promoting adhesion between the substrate and the thermal insulation layer, and a protective layer suitable for protecting the substrate from oxidation and/or corrosion,
    the environmental barrier at least partially covering the substrate,
    the at least one reactive layer being suitable for reacting with at least one CMAS compound selected from a calcium oxide, a magnesium oxide, an aluminum oxide and a silicon oxide,
    the at least one reactive layer covering at least a portion of the environmental barrier,
    wherein a material of the at least one reactive layer comprises an oxide of formula $A'A"BO_{5+\delta}$, A' being selected from a rare-earth element and yttrium, A" being selected from a rare-earth element, yttrium and aluminum, B being selected from zirconium, hafnium, tantalum and niobium, δ being a real number comprised between 0 and 0.5,
    wherein the oxide of formula $A'A"BO_{5+\delta}$ has a rare-earth element atomic fraction comprised between 18% and 25%.

2. The turbine part as claimed in claim 1, wherein the oxide of formula $A'A"BO_{5+\delta}$ has a lattice selected from a cubic lattice, an orthorhombic lattice and a hexagonal lattice.

3. The turbine part as claimed in claim 1, wherein A' and A" are the same element.

4. The turbine part as claimed in claim 1, comprising at least two reactive layers, the two reactive layers having at least one different element selected from A', A" and B.

5. The turbine part as claimed in claim 1, wherein the oxide is suitable for forming a precipitate comprising apatite upon contact with a CMAS compound selected from a calcium oxide, a magnesium oxide, an aluminum oxide and a silicon oxide.

6. The turbine part as claimed in claim 1, wherein the oxide of formula $A'A''BO_{5+\delta}$ has a crystal lattice having at least one space group of the type selected from $Fm\overline{3}m$, Pnma and $P6_3/mmc$.

7. The turbine part as claimed in claim 1, wherein the reactive layer directly covers a layer selected from the thermal insulation layer and the protective layer.

8. The turbine part as claimed in claim 1, wherein the reactive layer has a thickness comprised between 5 μm and 500 μm.

9. The turbine part as claimed in claim 1, wherein the reactive layer comprises between 5% and 80% by volume of said oxide of formula $A'A''BO_{5+\delta}$ and further comprises at least 10% by volume of an element selected from YSZ, $Al_2O_3$, $Y_2O_3$—$ZrO_2$—$Ta_2O_5$, $RE_2Zr_2O_7$, and $RE_2Si_2O_7$ and combinations thereof, wherein RE denotes an element selected from yttrium and a lanthanide.

10. The turbine part as claimed in claim 1, wherein the oxide of formula $A'A''BO_{5+\delta}$ is suitable for forming a product upon a first reaction with the CMAS compound, said product being suitable for forming an apatite phase upon a second reaction with the CMAS compound and/or with another product of the first reaction.

11. The turbine part as claimed in claim 1, wherein the at least one reactive layer covers all of the layers of the environmental barrier.

12. A process for protecting a turbine part comprising a step of depositing on the turbine part, a reactive layer suitable for reacting with at least one CMAS compound selected from a calcium oxide, a magnesium oxide, an aluminum oxide and a silicon oxide,
wherein a material of the reactive layer comprises an oxide of formula $A'A''BO_{5+\delta}$, A' being selected from a rare-earth element and yttrium, A" being selected from a rare-earth element, yttrium and aluminum, B being selected from zirconium, hafnium, tantalum and niobium, δ being a real number comprised between 0 and 0.5,
wherein the oxide of formula $A'A''BO_{5+\delta}$ has a rare-earth element atomic fraction comprised between 18% and 25%,
wherein the turbine part comprises:
a substrate, and
an environmental barrier comprising a thermal insulation layer, a sublayer suitable for promoting adhesion between the substrate and a thermal insulation layer, and a protective layer suitable for protecting the substrate from oxidation and/or corrosion,
wherein the environmental barrier at least partially covers the substrate, and
wherein the reactive layer is deposited on the environmental barrier.

13. The process as claimed in claim 12, wherein the reactive layer is deposited by a method selected from atmospheric-pressure or low-pressure plasma spraying, suspension plasma spraying, solution plasma spraying, high-velocity powder or suspension flame spraying, electron-beam evaporation, vapor deposition, sol-gel and electrophoresis.

14. The process as claimed in claim 12, wherein the reactive layer covers all of the layers of the environmental barrier.

* * * * *